Figure 1:
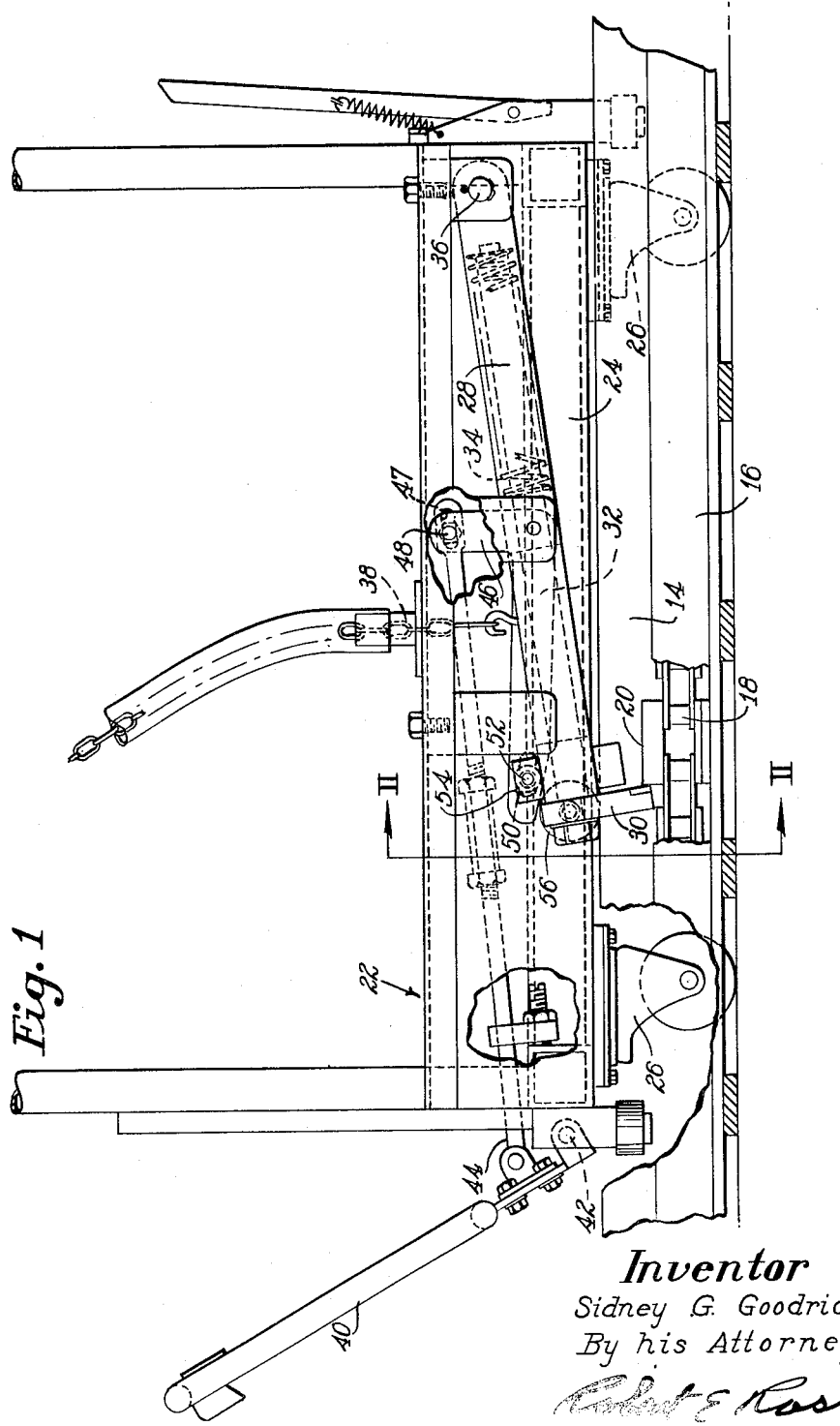

3,148,634
CONVEYOR RACKS
Sidney G. Goodrich, Leicester, England, assignor to United Shoe Machinery Corporation, Flemington, N.J., a corporation of New Jersey
Filed Oct. 19, 1962, Ser. No. 231,810
Claims priority, application Great Britain May 12, 1962
3 Claims. (Cl. 104—172)

This invention relates generally to conveyor systems of the type in which article carrying racks are moved between work stations by a conveyor chain, and has particular reference to a rack having an improved mechanism for engaging the conveyor chain.

In a co-pending application, Serial No. 158,682, filed December 12, 1961 by the present inventor and others, there is disclosed a work handling system comprising individual shoe racks which are adapted to be moved between work stations by a floor mounted conveyor chain. The racks are each provided with a towing mechanism adapted for engagement by bosses on the chain, with bumper means provided for causing disengagement of said mechanism from the chain on collision of the rack with a stationary object.

In the embodiment of the invention illustrated in the above-identified application, the towing mechanism comprises an arm having a towing plate disposed on the end thereof which rests on the chain in engagement with a chain dog when the rack is in motion, and is lifted upwardly out of engagement with the chain dog by the action of the bumper on collision thereof with a preceding rack, or by engagement of a laterally extending portion of the towing plate wtih a stop member disposed alongside the chain.

Although the above embodiment operates satisfactorily in installations where the floor on which the racks travel is reasonably level, the operation is less satisfactory in situations where the floor is uneven. In such cases the rack tends to ride up and down in relation to the conveyor chain, causing excessive wear of the chain engaging mechanism and occasionally causing intermittent disengagement of the mechanism from the chain, due to the inertia of the bumper mechanism.

The object of the invention is to provide a conveyor system of the type described in which means is provided for maintaining the chain engaging mechanism of the rack in a predetermined position in relation to the conveyor chain.

A further object of this invention is to provide a rack for the purpose described having a chain engaging mechanism which is adapted to compensate for variations in floor level.

Other objects of the invention will be apparent to one skilled in the art from the following description of a specific embodiment thereof.

Figure 2:
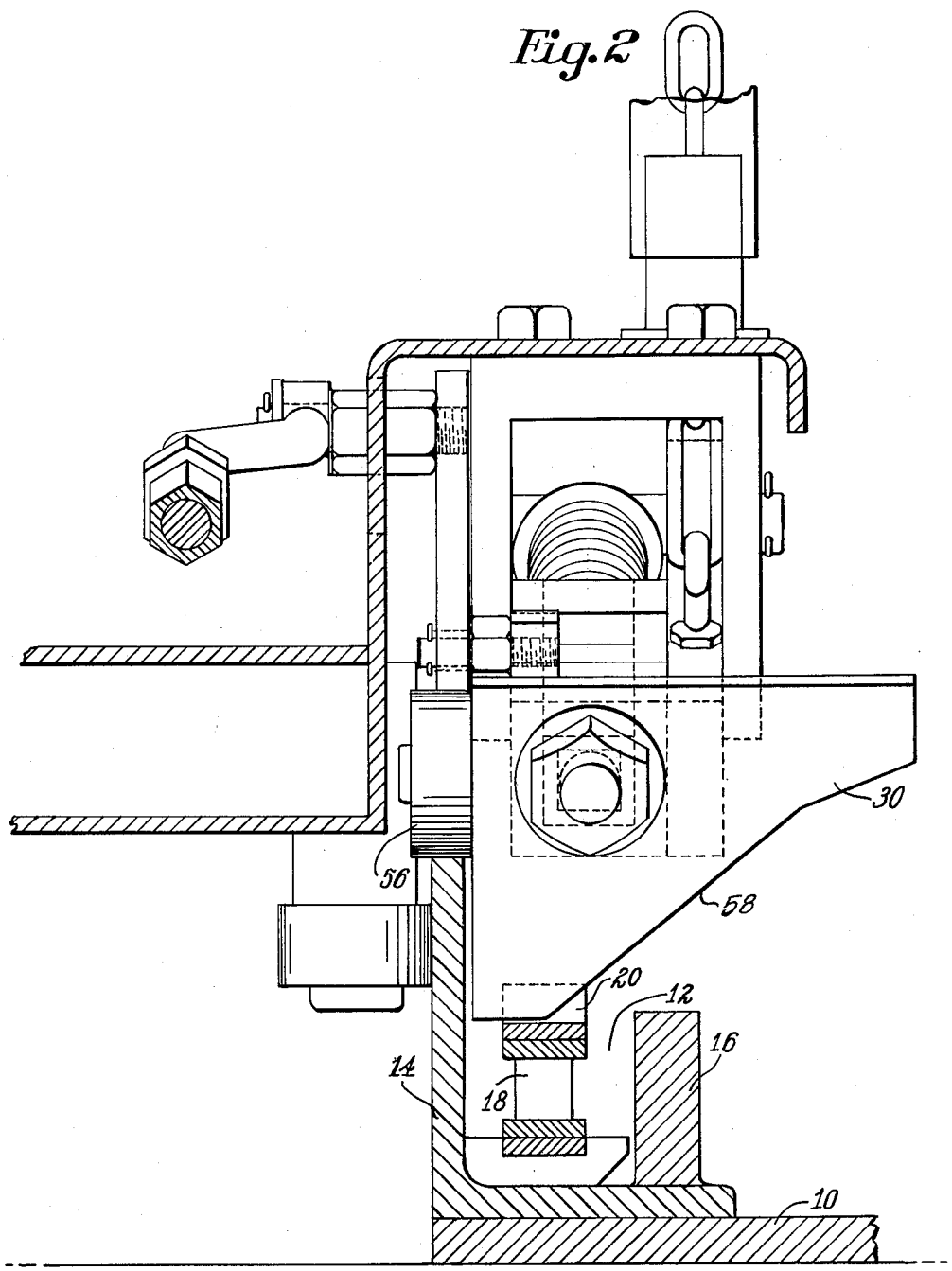

In the drawing,

FIG. 1 is a view in side elevation of a rack mechanism embodying the features of the invention disposed in operative relative to a conveyor chain; and FIG. 2 is a view in section taken on the line II—II of FIG. 1.

Referring to the drawings there is illustrated a portion of a drag-line type conveyor system which comprises an elongated platform 10 having a channel 12 formed by a pair of upstanding members 14 and 16 disposed alongside said platform. Disposed within the channel 12 is a tow chain adapted for longitudinal movement therein by suitable drive means (not shown) being formed of links 18, some of which have upstanding towing lugs 20.

The tow chain is adapted to tow article carrying devices such as a shoe rack 22 between pool positions and work stations, where they are stopped automatically by any convenient means, such as by a stop mechanism as disclosed in the above-identified application.

The rack 22 comprises generally a base 24 supported by casters 26 to enable the rack to roll freely along the floor when being towed by the conveyor chain, and to enable the rack to be moved directly away from the chain to permit an operator to position the rack at a convenient location at a work station for removing the articles therefrom.

To provide means on the rack for engagement with the tow chain, a towing arm 28 is mounted on the rack, with a towing plate 30 disposed on the forward end thereof. The plate 30 is mounted on a shaft 32 disposed inside the arm which is resiliently retained therein by means of spring 34. The arm 28 is movable upwardly and downwardly about pivot 36 to effect disengagement and engagement, respectively of the tow plate 30 with the tow chain. In the illustrated embodiment a chain 38 may be connected between the arm 28 and a manually operated lever (not shown) to provide manual means for disengaging the tow plate from the chain. Disengagement may also be effected automatically by engagement of the tow plate 30 with a stop member as the rack arrives at a work station, or automatically by engagement of a bumper 40 with the rear of a preceding rack. For this purpose the bumper 40 is pivoted to the rack base at 42, with an operating rod 44 extending from the bumper to the upper end of a bell crank lever 46. The end of the rod 44 is provided with an elongated slot 47, receiving a pin 48 on the lever, so that a predetermined amount of motion of the lever can occur without affecting the bumper 40, for a purpose to appear hereinafter. The forward end of the bell crank lever is provided with a slot 50, receiving a pin 52 on a member 54 secured to the tow arm 28.

Secured to the forward end of the tow arm on the inner side of the tow plate 30 is a roller 56, positioned to rest on the upper edge of the upstanding member 14 when the rack is in operative relation to the conveyor, and to maintain the bottom edge of the tow plate 30 in a predetermined relation to the tow chain, preferably so that the bottom edge is positioned just above the surface of the connecting links of the chain. To permit the roller to be so positioned when the rack is moved laterally toward the conveyor into operative relation therewith, the tow plate 30 is provided with a camming surface 58 extending upwardly and outwardly from the bottom thereof, to enable the plate 30 to cam itself over the upstanding member 14 so that the roller drops on to the member 14.

Hence, as the rack is towed along the floor, the roller 56 rides on the upper edge of the upstanding member 14, so that the tow plate 30 is maintained in a constant relation to the tow chain. As the rack moves slightly up or down over floor irregularities, the slots 47 and 50 permit the tow arm 28 to pivot in relation to the rack without causing motion of the bumper 40.

The inertia of the bumper 40 is thereby prevented from affecting the motion of the towing arm necessary to accommodate variations in floor level. Such inertia might otherwise cause intermittent disengagement of the tow plate from the chain driving lugs.

Although in the illustrated embodiment the positioning of the tow plate is accomplished by the roller 56 riding on the upper edge of the member 14, it will be understood that other means for supporting the tow plate in predetermined relation to the chain may be provided if desired.

Since certain other obvious changes may be made in the device without departing from the scope of the invention it is intended that all matter contained herein be interpreted in an illustrative and not in a limiting sense.

Having thus described my invention, what I claim as new and desire to secure by Letters Patent of the United States is:

1. An article carrying device for co-operation with a conveyor chain of the type described having upwardly projecting towing lugs, and a guide rail disposed alongside the chain, said device having a towing arm with a towing member disposed thereon, bumper means disposed on the forward end of the device, connecting means between said bumper and the towing arm whereby actuation of the bumper by collision with an object disengages the towing member from the chain, means on said towing arm adapted to rest on the guide rail for supporting the towing member in spaced relation to the chain so that said towing member engages only the towing lugs of said chain, and lost motion means in said connecting means to permit a limited amount of vertical movement of the towing arm in relation to the device without causing corresponding motion of said bumper means.

2. An article carrying device for co-operation with a conveyor apparatus of the type described having a chain with towing lugs and a guide rail disposed alongside the chain, a towing arm pivoted at one end to said device and having a towing member at the other end, said towing member having a depending portion for engagement by a lug of the chain, a camming portion adapted to enable the towing member to ride laterally over the guide rail so that the depending portion is positioned above the chain, and a roller disposed on the towing arm, said roller being positioned to rest on the guide rail when the depending portion is in position above the chain to maintain said depending portion in predetermined spaced relation thereto.

3. An article carrying device for co-operation with a conveyor apparatus of the type described having a chain with towing lugs and a guide rail disposed alongside the chain, a towing arm pivoted at one end to said device and having a towing member at the other end, said towing member having a depending portion for engagement by a lug of the chain, a camming portion projecting laterally in one direction from said towing portion to enable the towing member to ride laterally over the guide rail so that the depending portion is positioned above the chain, and a roller positioned on the side of the depending portion opposite the camming portion positioned to rest on the guide rail when the depending portion is in position above the chain to maintain said depending portion in predetermined spaced relation thereto.

References Cited in the file of this patent
UNITED STATES PATENTS

| | | |
|---|---|---|
| 1,437,536 | Mason | Dec. 5, 1922 |
| 2,619,370 | Leger | Nov. 25, 1952 |
| 2,737,902 | Folsom | Mar. 13, 1956 |
| 2,885,969 | Kay et al. | May 12, 1959 |
| 2,987,011 | Melmer | June 6, 1961 |
| 3,070,036 | Burrows | Dec. 25, 1962 |